United States Patent
Heinrich et al.

(10) Patent No.: US 12,032,357 B2
(45) Date of Patent: *Jul. 9, 2024

(54) SYSTEM AND METHOD FOR LOGGING PROCESS STEPS

(71) Applicant: Francotyp-Postalia GmbH, Berlin (DE)

(72) Inventors: Clemens Heinrich, Oranienburg (DE); Dirk Rosenau, Berlin (DE); Stephan Gunther, Glienicke (DE); Uwe Hubler, Neuenhagen (DE)

(73) Assignee: Francotyp-Postalia GmbH, Berlin (DE)

( * ) Notice: Subject to any disclaimer, the term of this patent is extended or adjusted under 35 U.S.C. 154(b) by 150 days.

This patent is subject to a terminal disclaimer.

(21) Appl. No.: 16/716,644

(22) Filed: Dec. 17, 2019

(65) Prior Publication Data

US 2020/0301400 A1 Sep. 24, 2020

(30) Foreign Application Priority Data

Dec. 19, 2018 (DE) .......................... 102018132991.1

(51) Int. Cl.
  *G05B 19/418* (2006.01)
  *G05B 19/4155* (2006.01)
  *G05B 23/02* (2006.01)

(52) U.S. Cl.
  CPC ... *G05B 19/4155* (2013.01); *G05B 19/41875* (2013.01); *G05B 23/0205* (2013.01); *G05B 2219/31372* (2013.01)

(58) Field of Classification Search
  None
  See application file for complete search history.

(56) References Cited

U.S. PATENT DOCUMENTS

| | | | |
|---|---|---|---|
| 4,481,604 A * | 11/1984 | Gilham | G07B 17/00508 101/91 |
| 5,742,823 A * | 4/1998 | Edwards | G06F 9/5066 717/149 |
| 6,839,604 B2 | 1/2005 | Godfrey et al. | |
| 7,945,518 B2 | 5/2011 | Kampert | |
| 9,922,332 B2 * | 3/2018 | Sant'Anselmo | G06Q 20/10 |
| 2004/0249764 A1 * | 12/2004 | Delitz | G07B 17/00435 705/60 |

(Continued)

FOREIGN PATENT DOCUMENTS

| | | |
|---|---|---|
| DE | 60123411 T2 | 2/2007 |
| DE | 10200554496 B3 | 5/2007 |

(Continued)

OTHER PUBLICATIONS

Bhat, "Introducing Azure Cool Blob Storage", 2016, as retrieved from <https://azure.microsoft.com/en-us/blog/introducing-azure-cool-storage/> on Dec. 1, 2022. (Year: 2016).*

(Continued)

*Primary Examiner* — Jason D Mitchell
(74) *Attorney, Agent, or Firm* — MaxGoLaw PLLC (57) ABSTRACT

A system and a method for executing a work process on an object are provided, the system includes at least one work station, an acquisition device and an auditor device. The system and method can be used to log process steps of a work process.

20 Claims, 2 Drawing Sheets

(56) References Cited

U.S. PATENT DOCUMENTS

| | | | |
|---|---|---|---|
| 2005/0274788 A1* | 12/2005 | Craig | B07C 1/00 235/375 |
| 2005/0283449 A1* | 12/2005 | Jacobson | G07B 17/00508 705/410 |
| 2006/0271339 A1* | 11/2006 | Fukada | G05B 23/0283 702/185 |
| 2008/0188978 A1* | 8/2008 | Zamanian | G06F 3/126 700/221 |
| 2010/0004939 A1* | 1/2010 | Ferraro | G07B 17/00508 705/1.1 |
| 2011/0099114 A1 | 4/2011 | Lehrieder | |
| 2011/0173828 A1* | 7/2011 | York | G01B 11/007 33/503 |
| 2011/0231008 A1* | 9/2011 | McIntee | G07B 17/00459 700/224 |
| 2012/0066060 A1* | 3/2012 | Wilen | G06Q 30/0241 705/14.49 |
| 2012/0303508 A1* | 11/2012 | Stephens | G06F 16/2228 705/37 |
| 2014/0108076 A1* | 4/2014 | Reineccius | G06Q 10/087 705/7.12 |
| 2015/0057875 A1* | 2/2015 | McGinnis | G07C 5/0841 701/31.6 |
| 2015/0273530 A1* | 10/2015 | Berdelle-Hilge | B65H 1/30 414/811 |
| 2015/0358313 A1* | 12/2015 | Hussain | H04L 63/0823 713/173 |
| 2016/0149877 A1* | 5/2016 | Kancharla | H04L 63/062 713/171 |
| 2018/0137494 A1* | 5/2018 | Matsukura | G06Q 20/201 |
| 2018/0234455 A1* | 8/2018 | Hocker | H04L 67/34 |
| 2018/0322314 A1* | 11/2018 | Kim | H04L 63/10 |
| 2019/0097870 A1* | 3/2019 | Belmonte | G06Q 10/0833 |
| 2019/0101889 A1 | 4/2019 | Riek et al. | |
| 2019/0118767 A1* | 4/2019 | Britt | H04L 67/125 |
| 2019/0217475 A1* | 7/2019 | Neuhaus | B25J 9/1687 |
| 2020/0007313 A1* | 1/2020 | Vouk | H04L 9/0637 |
| 2020/0184692 A1* | 6/2020 | Yang | G06T 11/206 |
| 2020/0218230 A1* | 7/2020 | Heinrich | G05B 19/4065 |
| 2020/0344075 A1* | 10/2020 | Gremaud | H04L 9/0894 |
| 2020/0374112 A1* | 11/2020 | Sovio | H04L 9/0841 |
| 2021/0216060 A1* | 7/2021 | Moeller | H04W 12/63 |
| 2021/0229231 A1* | 7/2021 | Fukatsu | G05B 19/406 |

FOREIGN PATENT DOCUMENTS

| | | |
|---|---|---|
| DE | 102008063658 A1 | 6/2010 |
| DE | 202010017375 U1 | 12/2011 |
| DE | 102016209557 A1 | 12/2017 |
| EP | 1736935 A2 | 12/2006 |

OTHER PUBLICATIONS

"Hardware security module," Retrieved from "https://en.wikipedia.org/w/index.php?title=Hardware_security_module&oldid=867986750", Oct. 28, 2019, 6 pages.

* cited by examiner

SYSTEM AND METHOD FOR LOGGING PROCESS STEPS

FIELD OF THE INVENTION

The invention relates to a system and a method for executing a work process on an object, the system comprising at least one work station, an acquisition device and an auditor device. The system and method can be used to log process steps of a work process.

BACKGROUND OF THE INVENTION

There is a technical need for logging work or process steps that are carried out by a technical device. For example, if the process consists of manufacturing or processing a product, the data determined by the logging can be stored or deposited in connection with the product so that it may be retrieved for later use. In particular, there is a need to ensure that the link between log data and product is as secure as technically possible, i.e., in particular that it is protected against external manipulation and cannot be falsified.

SUMMARY OF THE INVENTION

It is therefore an objective of the present invention to provide such a system and such a method for logging process steps. It is preferred that not only a simple logging of process steps is enabled, but a particularly secure documentation of work steps within a work station of a system or a device is provided, wherein the state of an object is to be changed by the work station. It would be particularly desirable if the log data could be linked to the processed product in order to be retrievable for later processing, ideally over the entire life cycle of the object or product.

The objective is solved by the features of independent claims. Advantageous features of the invention are recited in the dependent claims. According to the invention, a system is provided for executing a work process on an object, wherein the work process comprises at least one process step and wherein the work process at least temporarily changes at least one state of the object, wherein the system comprises at least the following components:
  a work station for executing the at least one process step of the working method,
  an acquisition device for acquiring at least one acquisition information assigned to the object
  an auditor device,
  Wherein each work station is assigned an acquisition device. The system is characterized in that an identification element is assigned to the object and the acquisition device is adapted to output the acquisition information to the auditor device, the auditor device being adapted to assign the acquisition information to the identification element of the object. In the sense of the invention the described system may be referred as a logging system or as a system for logging process steps.

In a further aspect, the invention relates to a method for executing a work process on an object, wherein the work process is carried out by a work station and comprises at least one process step and wherein the work process at least temporarily changes at least one state of the object. The method comprises the following steps:
  a) providing the object,
  b) assigning an identification element to the object,
  c) acquiring of at least one acquisition information by an acquisition device,
  d) transmitting the acquisition information by the acquisition device to an auditor device,
  e) assigning the acquisition information to the identification element(s) of the object by means of the auditor device.

DETAILED DESCRIPTION OF THE INVENTION

It is preferred in the sense of the invention that the described method is referred to as a logging method or a method for logging process steps. The definitions, beneficial effects and surprising advantages of the invention described in relation to the proposed system apply analogously to the proposed method, and vice versa. The dependent claims and the description provide further advantages, features and details of the invention. The features mentioned therein maybe be individually or in any combination of significance for the invention. Thereby, the disclosure of the individual aspects of the invention can always be referred to reciprocally.

The components of the system are adapted in particular for data processing, wherein the components of the system comprise means or are adapted to carry out the described procedural steps.

A significant concept underlying the invention relates to the fact that with the proposed system or method a logging of process steps may be carried out. The proposed system or the proposed method preferably result in allowing for the assignment of an ID or an ID value to a product and as well as a particularly secure logging of individual process steps which form the working process or the working method and which the product pass through.

It is a particular advantage of the invention that the process steps may be assigned to the product by using IDs or ID values. It is preferred in the sense of the invention that the product may preferably also be referred to as an object, wherein the terms are used synonymously. The terms "ID" and "ID value" are preferably used synonymously with the term "identification feature" or "identification element", respectively.

An essential feature of the invention is that an identification element is assigned to the object or the product.

Said assignment of the identification element may preferably be accomplished already during the manufacturing of the unprocessed raw or initial object, as well as during the execution of process steps, e.g., by a work station or its cryptographic security device, or by the auditor device with the help of the work station. For example, it is possible that a physical memory connected to the object already contains an unalterable basic identification, which is supplemented by further process steps. The identification element is preferably already present in the auditor device, for example in a memory configured to this end and/or is preferably supplied to the auditor device via a trustworthy channel and/or in a cryptographically secure manner.

It may be preferred in the sense of the invention that the identification element is physically assigned to the object. Preferably, such an assignment is also referred to as a physical link between the object and the identification element. A physical assignment may, for example, consist of a memory or a memory device being permanently connected to the object.

Such a memory can be formed by an OTP, for example. The term "OTP" is preferably understood in the sense of the invention as "one time programmable". The memory, which is preferably formed by an OTP, therefore preferably represents an electronic component that is inscribed only once. For this purpose, the OTP preferably comprises a non-volatile memory, whereby the physical association between object and identification element can preferably be realized by the fact that the object comprises the OTP memory and by having these two objects firmly connected to each other.

Preferably, the memory is readable by the auditor device, so that the auditor can assign the acquisition information to the ID. It may also be preferred in terms of the invention that the identification element is logically assigned to the object. A logical assignment can, for example, be formed by an ID that is assigned to the object. It is also preferred in the sense of the invention to refer to a logical link between object and identification element.

An ID or an ID value is preferably capable of distinguishing between objects that initially appear identical or similar, for example by assigning a combination of numbers or an alphanumeric code, such as a file number, to the objects, which differ from each other even when the objects appear identical or similar, thereby significantly reducing the risk of confusion between objects. A logical link is preferably made by the system, in particular the auditor device and/or the work station, in particular in connection with a connected and/or integrated memory unit. It may be preferred that a printing of a code containing an identification element also includes a process step that changes the state of an object. For example, a code printed on an object, e.g., in the form of a barcode and/or franking code, may change the state of an object, in particular its value, and at the same time include an identification element in the printed code.

In the context of the proposed method, it is intended to provide an object or product that initially exhibits a first state.

It is preferred in the sense of the invention that said first state may be described with a status parameter from which an acquisition device, an acquisition information or an acquisition value can be derived. In the following, the term acquisition information is often used. However, it is preferred that at least one acquisition information is meant by the term acquisition information as well as also several, for example 2, 3, 4, 5, 10, 50 or 100 acquisition information. The number of information is preferably not the number of bits used, but the number of information in the semantic sense, i.e., the information with different meanings in relation to the object.

In particular, a physical and/or logical identification element can also be assigned to the object. In the context of the proposed method, a work process is executed on the object by a work station that is part of the proposed system or represents a component of the system. The work process comprises at least one process step. In the context of the present invention, it is intended that the work process changes at least one state of the object at least temporarily. In the sense of the invention, this preferably means that a change in the state of an object lasts at least for a certain period of time, i.e., for a period of time with a certain duration, wherein the change of state can be permanent or wherein the change of state can be terminated after a certain period of time. In the latter case, it is preferred to refer to a temporary change of state. In this case, the object can, for example, return to its initial state, which is referred to as the first state in the sense of the invention. However, it may also be preferable for the object to be transferred to a third state which is different from the initial state and the intermediate state, which is preferably referred to as the second state.

The object whose state is changed by the working process may preferably be a physical or a nonphysical object. Preferably, a work station is used to execute the work process, which can be a franking machine or a component of a franking machine, for example. In this case, the object can be a physical object, for example, an envelope printed with a franking code. The printing of the franking code represents a change in the state of the object in the sense of the invention, because the envelope is transferred from a first state to a second state by the printing. In the first state the envelope is preferably unprinted and thus unfranked, whereas in the second state the envelope is printed and thus franked.

For example, the object can also be a numerical value or a parameter set that describes the state of an object or a process step. A change of this numerical value or this parameter set can preferably represent a change of an object state in the sense of the invention. If a numerical value or each individual parameter in a parameter set changes, this is preferably referred to as a complete change of the object state in the sense of the invention. If only one parameter or a subset of the parameters of the parameter set changes, this is preferably referred to as a partial change of the object state.

With the proposed system and the proposed method, it is advantageously possible to monitor the status of system components, such as work stations or objects, or to log the process steps used or applied to process or modify an object. Preferably the logging is carried out at a particularly high security level, which is preferably ensured by the provision of the auditor device, which can be referred to as a Hardware Security Module (HSM), for example. The provision of logging options for process steps is particularly advantageous because there is a high demand in business and industry for certification, documentation and logging options that meet high security requirements.

It is preferred in the sense of the invention that the work process, the process steps of which are logged in the proposed method, comprises at least one process step. In the sense of the invention, this preferably means that the work process may comprise one or more process steps. Preferably, at least one state of the object changes during the execution of the work process, i.e., one or more states of the object can be changed. In the sense of the invention, it may be preferred that each state of the object is changed with a separate process step. Alternatively, it may also be preferred that several process steps are required to change one state of the object or that several object states can be changed with one process step.

The term "state of an object" in the sense of the invention preferably describes the state which an object may have with respect to a property. For example, if the object is formed by an envelope, the envelope may be printed or unprinted, franked or unfranked, open or sealed. These object states are referred to as binary states or binary properties of the object in the sense of the invention because they can be present in two different forms.

The binary states preferably represent disjoint subsets of the state space, wherein the state space is preferably formed by two disjoint subsets and the object can in each case be present in a state which is assigned to either a first or a second subset of the state space. The transfer of the object from a first to a second state is preferably performed with the work station of the proposed system, wherein the work station, by executing a process step, causes this transfer from a first to a second binary state. However, it may also be preferred in the sense of the invention that the object states are continuous states, wherein the states preferably merge smoothly into one another and do not form disjoint subsets of the state space.

For example, if the object is formed by an envelope, the work process may involve franking and sealing the envelope. In this case, the work process consists of two process steps—franking and sealing—with regard to both properties, which are each changed by the one process step, binary object states are present, namely franked and unfranked, as well as open and closed.

It may also be preferred in the sense of the invention that the execution of a process step on one object—for example the envelope—changes the state of another object. If, for example, the franking of the envelope is carried out by a franking machine and the envelope is thereby transferred from a first state (unfranked) to a second state (franked), this change of state can simultaneously reduce a numerical value stored in the franking machine. For example, the franking machine may store a credit value which corresponds to an amount of money with which a user has topped to a franking machine in order to frank his daily outgoing mail. If an envelope is now being franked, a numerical value can be assigned to this franking operation, depending on the postal product selected for franking the envelope. This could be, for example, without limitation a postage amount for a standard letter, a maxi letter or a registered letter. Triggered by the franking process, the credit value stored in the franking machine is reduced by the numerical value that corresponds to or is assigned to the postal product.

In the sense of the invention, the reduction of the credit value preferably corresponds to the change of a state of a non-physical object. In this case, a state within the franking machine, which in this example preferably represents a work station for executing the work process, is changed, namely from a first, original credit value to a second credit value reduced by the franking process. In other words, the franking process changes the states of two objects, namely the state of the envelope and the state of the credit value, so that here two state changes are made in one process step.

It may be preferable, in the sense of the invention, that when the envelope is printed, in addition to the information required by the post office for franking the letter, further information is printed on the envelope. This can preferably relate to meta data describing the franking process. The meta data may include, for example, information on the location or device type of the franking machine, the time of franking, information on whether individual or collective franking was performed, and so on. It is preferred in the sense of the invention that said meta data is associated with or formed by the acquisition information acquired by the acquisition device. This information can, for example, be integrated into the printed postage code or it may be printed on the envelope next to the postage code. Such printing creates, for example, a physical link between an identification element and the object or an identification element is physically assigned to the object. Preferably in this example by linking the meta data to the modified product, in this case the envelope, the logging of the process step "printing" or "franking" can be enabled.

It may also be preferred in the sense of the invention that a logical link is established between the identification element and the object. This can be achieved, for example, by storing the meta data described above in a memory so that it can be retrieved for later use. The memory can be a physical memory or a cloud or a memory in a block chain. The use of block chain technologies for logging purposes is particularly advantageous because the corresponding meta data describing a process step can, for example, be provided with a time stamp that cannot be manipulated and it furthermore possible to note which data on the product or process step was available at what point om time.

For example, the work station can be connected to a block chain structure to store relevant process and object information in the block chain. In this preferred embodiment of the invention, the log system may include a block chain structure.

In the context of the proposed method, it is also envisioned that an acquisition information is be acquired by means of an acquisition device. The acquisition device may also be synonymously referred to as an acquisition apparatus. Preferably, each work station of the proposed system is assigned an acquisition device with which, for example, states and/or state changes of the work station can be acquired, which are preferably described as operating parameters and/or with which states and/or state changes of the object can be acquired, which are preferably described as status parameters. It is further intended that the acquisition information or values determined by the acquisition device are transmitted to the auditor device of the proposed system or that the acquisition information is output to the auditor device.

Subsequently, the auditor device preferably assigns at least one selected acquisition information to an identification element of the object that is processed by the work process or that is subject to a change of state within the proposed method. It is preferred in the sense of the invention that the assignment of the acquisition information to the identification element of the object is executed in a manner that is particularly well protected against undetected manipulation. In the sense of the invention, this preferably means that the protection is carried out using FIPS-certified devices and/or FIPS-certified methods. It is preferred in the sense of the invention that the auditor device is adapted to add relevant components to the system. It is preferred in the sense of the invention that the assignment of the acquisition information to the identification element of the object is unique and that this enables a serialization of the objects.

The proposed system shall include at least one work station, one acquisition device and one auditor device. The work station, acquisition device and auditor device are referred to as system components in the sense of the invention. The term "at least" means, preferably in the sense of the invention, that the system comprises, for example, at least one work station, but it may also be equally preferred that the system comprises two or three work stations. This applies analogously to all system components. It is also possible that the system includes other components in addition to the system components mentioned. It may be preferred in the sense of the invention that the system components are located together in one location. However, it may also be preferred that individual system components or groups of system components are located or set up in different locations.

The work station is preferably adapted to perform at least one process step of the working method. The working method, preferably also referred to as a working process in the sense of the invention, preferably comprises one or more process steps, wherein the process steps may be carried out with one or more work stations of the proposed system. A work station can be, for example, a franking machine, wherein a franking machine preferably comprises a main board, a printing system for issuing or printing letters, as well as a display and mechanical devices for conveying envelopes or label strips.

Various software applications can be installed and operated on the mainboard of the franking machine. In terms of the invention, it is preferred that corresponding postage values or postage codes are printed directly on an envelope or a label strip. The printing of a postage code on an envelope or a label strip is preferably referred to in the sense of the invention as "creation of an imprint", whereby the creation of the imprint in the sense of the invention preferably corresponds to a change in the state of an envelope, i.e., an object. It is preferred in the sense of the invention that the impression is created by means of a cryptographically operating security device, preferably forming part of the franking machine, which may be associated, for example, with the auditor device of the proposed system.

The acquisition device is preferably adapted to acquire one acquisition information that is assigned to the object or product. It is preferred in the sense of the invention that each work station of the system is assigned an acquisition device. If the proposed system comprises, for example, two work stations, the system preferably also comprises two acquisition devices, one work station and one acquisition device of the proposed logging system being assigned to each other. In particular, the acquisition device is used to forward or transmit the acquisition information to the auditor device of the proposed system. It is preferred in the sense of the invention that the process is referred to as "output of the acquisition information". The acquisition information can preferably also be referred to as an "acquisition value". It is preferred in the sense of the invention that the acquisition device acts as an information transmitter and information provider, while the auditor device acts as an information receiver.

Furthermore, the proposed system includes an auditor device that is adapted to assign the acquisition information to the identification element of the object. This is advantageously achieved in a manner that is particularly well protected against unrecognized manipulation.

By assigning acquisition information with the identification element of the object or product, it is advantageously achieved that each process step of the working method by which a state of the object is to be changed is securely logged, preferably by creating a link between the identification element and the object. Preferably, a particularly secure assignment of process steps to an object ID is achieved, which is advantageous for logging the process steps. In particular, the process steps can be logged by assigning acquisition values to identification elements of the object. The process steps are preferably process steps of the work process that are passed through by the object or product, for example, by performing an action on the object or product in the work station. In the sense of the invention, it is preferably intended that the work process comprises at least one process step and that at least one state of the object is changed at least temporarily by the work process.

The auditor device of the proposed system used in the proposed method may preferably also be called an auditor in the sense of the invention, the terms being used synonymously. The auditor device preferably comprises or is formed by a Hardware Security Module (HSM). The HSM can preferably also be part of the work station or another component of the proposed system. In the sense of the invention it is particularly preferred that the auditor device is a security device of the work station.

It is preferred in the sense of the invention that the HSM is a hardware-based cryptographic module, preferably with FIPS 140-2 certification. It is preferred in the sense of the invention that the statement that a device operates safely means from a technical point of view that the corresponding device has such a FIPS certification. In particular the provision of an auditor device operating with FIPS certification solves a technical problem by technical means, namely the provision of a particularly secure data transmission within a logging system and method. The HSM may be formed by or include a single chip module, an autonomous multi-chip module or an embedded multi-chip module. The HSM is preferably adapted to store data in a particularly secure manner. In particular, an HSM is capable of generating, storing, using and/or maintaining critical security parameters such as passwords, confidential data or keys for encrypting data.

For example, the keys can be symmetrical or asymmetrical. Advantageously, HSM can be used as cryptographic coprocessors. In preferred embodiments, an HSM can have a battery-powered circuit and/or voltage monitoring. This enables the integration or provision of a real-time clock for correct time recording and time stamping, which can ensure, for example, that expired keys may no longer be used. In addition, an HSM may include a redundant memory, which can be used, for example, to employ several technologies simultaneously for generating additional data security.

In particular, the HSM can be used to implement a public key infrastructure at the highest level, as known to the person skilled in the art.

According to the invention an HSM comprises a chain of certificates which are preferably loaded onto the device before the HSM is put into operation. In addition, the HSM is adapted to generate its own private and public device keys. Preferably, the private key does not leave the HSM at any time, while the public key can be handed over to the outside, for example, to an external server for signing. In return, the HSM can receive a personalized, signed device certificate, with which the HSM can significantly increase security in an Internet of Things system (JOT). The HSM can subsequently be recognized and authenticated by the external server as a "genuine" security device, which is made possible in particular by assigning a unique identifier. In this manner, authenticated TLS (Transport Layer Security) connections can be established in a particularly uncomplicated manner.

It is preferred in the sense of the invention that the acquisition device comprises at least one sensor or sensor system. The sensors of the acquisition device are preferably adapted to forward the acquisition information to the auditor device, the auditor device preferably being able to assign at least one acquisition information to the identification element of the object, an identification element being assigned to the object. The acquisition information preferably comprises or relates to operating and/or status parameters of the work stations, the status of the work station described by the operating and/or status parameter being assumed in particular at the time when the object passes through the work station. The operating parameter describes, for example, whether a work station is operational or not. The operating parameter is preferably an internal variable of the work station, such as a pressure medium level. In contrast, it is preferred in the sense of the invention that the status parameter relates to parameters which externally affect the system or the work station, e.g., also through the object. For example, a status parameter could be a temperature in a room in which the work station is located. However, the status parameter can also relate without limitation humidity, ambient pressure, time of day, brightness, air pollution, and so on.

It may be preferred in the sense of the invention that the acquisition device functions in particular as a safety device and that the proposed system preferably comprises several safety devices which can communicate with each other or among themselves. It is particularly preferred that the safety devices of the work stations form a communication network with each other in which information can be exchanged. It is particularly preferred that the exchange of information and communication in the communication network, which preferably forms part of the proposed system, is secure, i.e., that it meets the security requirements of the FIPS standard. It is particularly preferred that the communication in the preferred communication network is cryptographically secured, e.g., by using an appropriate public key infrastructure. A person skilled in the art knows how to implement such an infrastructure for a cryptographically secure communication in a network. In the sense of the invention, it is furthermore preferred that the proposed system or the proposed method may be used for logging process steps in a secure manner. This represents a substantial advantage of the invention.

For example, the proposed system and method can be used to establish a pollution monitoring system in a city or municipality. For example, a system of suction shafts for the exhaust gases emitted by vehicles may be installed on a street before a traffic light. Such suction shafts can be e.g., embedded underground at a distance corresponding to an average car length, calculated from a virtual line drawn at the level of the traffic lights.

The air in the vicinity of the suction shafts may be drawn into said suction shafts and analyzed, wherein preferably acquisition values of vehicles are acquired as a status information of the work station and/or acquisition values without vehicles, which preferably represent a second status information of the work station as a reference value for the current air pollution. The work station preferably comprises at least one suction shaft. In addition, monitoring means or identification units may preferably be provided, such as a camera, which preferably takes pictures of the corresponding vehicles to determine an identification element, so that the determined exhaust and pollutant results can later be associated with the corresponding vehicle.

The suction shafts, the analysis units in the suction shafts and the monitoring means preferably represent work stations in the sense of the present invention or are comprised by a work station and are in particular provided with acquisition devices, For the present application example, the sensors may be for instance air analysis sensors or optical sensors, including for instance a spectrometer, a non-dispersive infrared sensor, an interference filter correlator, an electrochemical cell, a paramagnetic measuring sensor, a thermal conductivity analyzer, (optical) filter, a photodetector and/or a camera. A vehicle and/or its exhaust gases or the exhaust gas values determined thereof may preferably represent objects in the sense of the invention to which identification elements can be assigned. Preferably, the acquisition devices collect the acquisition information—here, for example, the characterizing quantities of the exhaust gas values—and forward them to the auditor device. Said forwarding is referred to as "output" in the sense of the invention.

The identification elements or the identification element is preferably uniquely assignable to the object, e.g., by means of a license plate number. This can preferably be detected by an identification device linked to the work station, e.g., by a camera positioned in a suitable position near a suction shaft and/or another suitable sensor based on for example the measurement of an electromagnetic field. The information may also preferably contain, in addition to the identification element, for instance the license plate, further information, preferably acquisition information, which is assigned to the object, e.g., the vehicle type of the identified vehicle. Said information is preferably forwarded to an auditor device, where it is assigned to the acquisition information, preferably in cryptographically secure manner, so that preferably e.g., neither acquisition information nor identification element nor their assignment may visible and/or manipulated by an unauthorized third party, independent of the actual processing and/or memory location of the data.

The output may preferably be effected in that the auditor device determines on the basis of the information transmitted by the acquisition devices the actual state of the system by determining and/or evaluating the state and/or operating parameters of the work stations and/or the detected operating parameters, such as the current time, wherein in particular the state of the work station is examined at the time when the object passes through the work station. In the above-mentioned pollutant monitoring example, this can be, for example, the time at which a vehicle passes the suction shaft and/or passes the monitoring camera, and/or the time at which an exhaust gas quantity passes an analysis unit.

The particular advantage of the proposed system is that the data is exchanged between the system components "securely" in the sense of the invention, for example using FIPS certified security devices or system components or work stations, e.g., by using a public key infrastructure. This ensures in particular that the transmitted data cannot be externally manipulated, diverted or misused. The secure, i.e., FIPS-certified, transmission of data within the system represents a special advantage of the present invention.

In addition, the data collected and further processed by analysis may advantageously be subject to further use, e.g., for documentation purposes, for an on-site evaluation and/or a subsequent evaluation at a different location. For example, the exhaust and pollutant values of vehicles can be evaluated in such a way that average values are determined for each vehicle type, so that actual values for each individual vehicle of a vehicle type can be compared with said average value. For example, at a distance from the traffic lights at which the exhaust gas data were collected, a display device may be provided to inform vehicle users on said display of whether their vehicle is with an average range of the collected exhaust gas and pollutant values or whether deviations are present, which may require maintenance or repair of the vehicle.

The general use of the acquisition information, which is preferably not used for individual evaluation, but for general information and/or analysis in the context of a multitude of other acquisition information, may be referred to as documentation. In such a documentation, the assignment and/or linking of the acquisition information to the identification element is preferably not used. On the contrary, for an anonymized use of the data in the documentation it may be desirable to erase or not use said assignment. For example, it may be preferable to store the acquisition information once more without an identification element, whereby should be ensured in the sense of anonymization that the assignment to a concrete object is in principle not possible.

In the sense of the invention it may also be preferred to compare the acquisition information which is received, collected or determined by the acquisition devices of the work stations with so-called meta-data. The comparison preferably involves data which are known and stored, for example, in databases or in the auditor device. The data may also have been generated from the documentation described above. However, the data may also be provided by third parties and relate e.g., to exhaust emission values that car manufacturers specify in order to achieve certain registrations or to advertise their vehicles. The registration information or data generated on the basis of the registration information may be then used, for example, to verify the accuracy of this meta-data.

For example, it may be that the above-mentioned documentation includes actual exhaust gas values of a certain type of car determined by the work station, which can be subsequently compared e.g., with manufacturer's data. The vehicle type may be determined, for example, by optical recording with a camera, preferably during identification, and/or by comparing the identification element determined with a database, e.g., the registration data, which includes the vehicle type. At the very least the proposed invention may preferably be used to determine whether the data collected with the acquisition devices deviate from the known meta-data, which would be an indication of the incorrectness of the meta-data.

In the sense of the invention meta-data may also relate to current values for the pollution of the air in the area in which the vehicle of interest is driving. On the basis of the acquired values, which are preferably derived from the acquired and status information from the acquisition device, which correspond in particular to the current pollutant emission of the vehicle and are preferably linked to the identification element by the auditor device, an individual control of the vehicle e.g., authorized by the auditor device (this process may be preferably referred to as release), may be subsequently executed e.g., by means of an information transmission of control information by a work station on the basis of the vehicle identification.

This is preferably referred to as a process step on the object, whereby the object includes in particular the vehicle. The state of the object, which is preferably changed by in the process, can preferably be selected from the group comprising the emission of the vehicle, the location of the emission of the vehicle, the location and/or the route travelled by the vehicle, the control of the vehicle and/or an ability to activate the vehicle (if certain emission values are exceeded, the vehicle can for example be no longer started).

In the sense of the invention, the control information may preferably relate to binding navigation data for the vehicle navigation system, which in practice would correspond, for example, to flexible and individual driving bans, but it may also be accounting data, preferably in conjunction with navigation data, by means of which flexible and individual pollutant charges, e.g., pollutant-based tolls, are collected. In the sense of the invention, this transmission to the vehicle is advantageously cryptographically secured and preferably changes at least parts of the identification data or of data linked to the identification element, for example about the charges already paid or detours that had to be driven. In this manner, the traffic flow may be directed intelligently, depending on the current air pollution levels, such that on the one hand the pollution limits are not exceeded and on the other hand the resulting pollution loads are distributed equally.

In this exemplary embodiment it is preferred that control information or similar information from the work station is sent to the vehicle during or before the start of a journey, the control information being preferably binding and representing a change of state at the object. At the latest on the route, the work station or the acquisition device subsequently collects the acquisition information, e.g., in form of exhaust gas values emitted at a location and/or on the route. It may also be preferred not to use an acquisition device and/or a work station, which are permanently installed on a route, but instead to use an acquisition device in the form of a sensor on the vehicle's exhaust pipe and/or a work station comprising a computing unit on board the vehicle, which, for example, executes the route navigation. An identification element, which is preferably permanently assigned to the vehicle, but which can also, for example, include identification data about the driver, thereby protects, for example, an exhaust-based route navigation against manipulation.

If a network of exhaust gas ducts is installed in a city or municipality it may also be preferred in the sense of the invention to evaluate the data collected by the acquisition devices in relation to city districts or focal points of exhaust gas emission.

In a preferred embodiment of the invention, the auditor device is adapted to receive an input information and to assign the acquisition information to the object depending on the input information.

An "input information" preferably refers to information that the system receives from an external source, e.g., an external server, and that relates to the object and/or a work process to be performed on the object. Preferably, the input information can also be metadata.

For example, the acquisition information to be assigned to the object can be changed on the basis of the input information or its scope may be specified.

In relation to the above example of the use of the system for pollution monitoring, which allows pollution-based tolls or the control of vehicles, the input information may, for example, be an indication of metadata on emission levels or billing conditions. For example, the input information may be used to determine prices or price changes in relation to the toll to be settled, depending on the pollutant emission or route.

For instance, the permitted exhaust gas values can be updated by transmitting an input information. In the event of excessive pollutant emissions, the permitted emission values can be reduced e.g., in the short term to counteract a potentially harmful development.

Preferably, this can also be achieved with regard to operating and status parameters. For example, an updated price ratio may be provided as input information in relation to condition parameters such as weather data, ambient temperature, ambient pressure or average values for a current level of air pollution.

This allows a fast and flexible reaction to current developments. If, for example, the emission of pollutants has to be greatly reduced in the short term due to an increased temperature or fine dust pollution, a corresponding dynamic price adjustment can be implemented by means of an input information.

Individualized pricing systems are also possible. For example, the input information may concern changes to subscriptions or flat rates, according to which no additional charge should be made for certain customers for a given period or up to a pollutant emission limit.

For these vehicles or objects, for example, either the acquisition information to be assigned to the identification element can be adjusted or the documentation of routes subject to charges is suspended until the specified time period or pollutant emission limit is reached.

By providing an external input information in combination with the described processing by means of the auditor device, it is advantageously possible to react to changes in a secure and robust manner and to adapt the logging.

The external source may preferably be an external server, an external data processing facility or other input options, which are suitable and adapted to forward input information to the system.

The individualized adaptation of the process steps for selected objects can preferably be carried out using the described identification elements for the respective objects.

It is preferred in the sense of the invention that the proposed logging system or logging method can interact with other IoT systems or IoT methods, such as payment and/or authorization systems or methods. This advantageously further increases the wide range of possible applications of the invention.

It is preferred in terms of the invention that the auditor device is adapted to store the acquisition information in a memory device of the object and/or in a cloud. In a further preferred embodiment of the invention, the object comprises a memory device, wherein the acquisition information can be stored in said memory device. This allows the stored information to be used or retrieved for other purposes at a later time or to be assigned to a specific user profile.

In the sense of the invention it may be preferred to store the acquisition information locally or to access the acquisition information remotely. The local storage of the acquisition information within the system, for example at the location, where the data is generated and/or collected, preferably enables a pre-filtering of the data, so that, for example, not all data or data records need to be transmitted from the acquisition device to the auditor device, but only a significantly smaller amount of data. The fact that altogether less data has to be transferred saves transfer resources and the transfer of the relevant data can be carried out more quickly and with less effort.

It may also be preferred in the sense of the invention that the acquisition information is stored in a cloud. This enables to dispense the provision of a memory space within the auditor device, within another system component or within the object, thus saving space or providing a particularly space-saving auditor device or object.

If the data is stored in a cloud, the data of different systems or different system components can be compared with each other, for example, in order to determine average values or deviations within the framework of a benchmarking process or to identify objects, systems and system components that are operating "on target" or exhibit (significant) deviations from average behavior.

It is preferred in the sense of the invention that the auditor device and the other components of the system, especially also the acquisition device, are assigned an ID or an ID value. The corresponding IDs or ID values can be stored individually in each system component. However, it may also be preferred that the IDs or ID values of the system components are stored centrally at one location of the system, for example in a control device or in a memory device. In the sense of the invention it is in particular intended that an ID or an identification element is assigned to the object or product, the auditor device preferably being set up for this purpose.

It is preferred in the sense of the invention that the auditor device is adapted to establish a link between the acquisition information on the one hand and an ID of the object, an ID of the acquisition device, information on the work station, an ID of the auditor device and/or a time stamp on the other hand. In other words, in the sense of the invention, it may be preferred to establish a particularly secure link between
the acquisition information and an ID of the object,
the acquisition information and an ID of the acquisition device,
the acquisition information and an information about the work station,
the acquisition information and an ID of the auditor device and/or
the acquisition information and a time stamp.

It is preferred in the sense of the invention that the link is particularly secure, which may preferably be achieved by using FIPS certified devices and methods. Preferably the link is a cryptographically secure link.

The information about a work station can be, for example, an ID of the work station or information about the configuration of the work station. For example, it is preferred in the sense of the invention that the acquisition information corresponds to an operational and/or status parameter of the work station, the status described by the operational and/or status parameter being assumed by the work station at the time the object passes through the work station. The operation and/or status parameter describes, for example, whether or not a work station is operational. For example, if a work station is formed by a printer, the operating parameter may indicate that the printer is operational because there is enough paper and ink to complete an average print job. However, it is also possible that there is too little paper and/or ink in the printer, so that the printer is not ready and is not able to perform the desired function, such as printing a defined number of envelopes. The two different operating states of the printer—"operational" and "not operational"—would then be represented or reproduced by different operating parameters.

If the object or product is formed by a sheet of paper or an envelope which is printed by the printer as an exemplary work station, the operating parameter describes especially the state of the work station, which the work station assumes at the moment when the object or product is processed in the work station. In the above application example, it is preferred that the operating parameter describes the state of the printer that the printer is in or the moment when the sheet of paper or the envelope within the printer is imprinted. It is preferred in the sense of the invention that the state of the work station can be described by an operating parameter which is associated with the acquisition information, which is detected or acquired by the acquisition device.

For this purpose, the acquisition device may preferably include means to detect or acquire the status of the work station. These means may especially be sensors adapted to detect a condition or changes in a condition. The sensors may preferably be selected from a group comprising, but not limited to, photoelectric sensors, cameras, thermal sensors, optical sensors, electrical sensors, magnetic sensors and/or acoustic sensors. It is intended in the sense of the invention that each work station of the system is assigned at least one acquisition device for determining states of the work station, the states of the work station preferably being described with operating and/or status parameters, which can be assigned to an acquisition value within the scope of a preferred embodiment of the invention.

It may also be preferred in the sense of the invention that the acquisition information corresponds to a status parameter of the object. In this embodiment of the invention, it is preferred that the proposed system includes means with which the condition of the object may be acquired or detected. These means may in particular be sensors which are set up to detect a state of the object or changes in a state of the object. For example, if the object or product is formed by a sheet of paper or an envelope to be printed on by a printer as an exemplary work station, the system may include sensors capable of determining whether the paper is correctly loaded in the printer feeder or whether the paper is wrinkled or dirty. In said example of an application, the printing of the sheet of paper represents the change of state of an object brought about by the working method or process whose steps are to be logged by means of the proposed method and system.

It may also be preferred in the sense of the invention that the acquisition information corresponds to information about the passage of the object through the work station. In the sense of the invention, this information is preferably also referred to as "pass-through information" or as information that the object has passed through the work station or as information on the completion of the pass of the object through the work station. In the application example described herein, wherein the printer has finished printing the paper or envelope as exemplary products, the acquisition information may consist of the auditor device receiving a notification from the printer's acquisition device that the printing process is finished. It may also be preferred in the sense of the invention that the acquisition information includes information, which e.g., concern the object, while the object is being processed by the work station. If, for example, a sheet of paper gets stuck in the printer because, for example, the sheet of paper was wrinkled or the printer is defective, acquisition information may be generated by the printer's acquisition device and sent to the auditor device. The information that the print job could not be executed successfully on a first run can be stored, for example, as part of the meta data in connection with the object, for example, as part of the postage code that was successfully printed later or as information that is stored, for example, in a block chain.

It is preferred in the sense of the invention that the auditor device is adapted to secure the acquisition information with cryptographic means. This can be implemented, for example, by preferably digital signing the acquisition information. Preferably, the auditing device has cryptographic capabilities that are used in the generation of the digital signature in order to achieve or enhance encryption and/or authentication of the transmitted information. Preferably, the auditing equipment shall include cryptographic means for this purpose, such as a processor with high computing power which can be used to transmit and/or sign information, messages and/or transactions in the proposed system in encrypted form. It may be preferred to implement a public key infrastructure (PKI) to improve the security of information and its transmission.

It is preferred in the sense of the invention that the auditor device is adapted to verify the acquisition information.

The verification is preferably carried out by comparing an acquisition information with the identification information (the identification element), which is preferably to be assigned to the information or has already been assigned. As an example, the identification element "license plate number" can be compared with the acquisition information "vehicle type" and a comparison can be made, for example, with a database and/or with earlier related data. If the vehicle type assigned to the identification element does not correspond to the previously assigned information, a manipulation can be advantageously detected. By means of verification, preferably the correct execution of the respective process step can be recognized or achieved. In the case of a miss match, faulty process steps or manipulations can also be recognized.

It is preferred in the sense of the invention that the proposed method uses block-chain technologies in order to document the successfully performed process steps preferably on an object in an unalterable manner, especially by means of a block chain and/or to assign status information in an unmanipulable manner to identification elements and thus to make the processing state and/or condition status of the object general, secure and/or in its course accessible.

The invention is described in more detail in the following figures. It is noted that the drawings are merely of exemplary nature to clarify the invention and not intended to be limiting.

Figure 1:
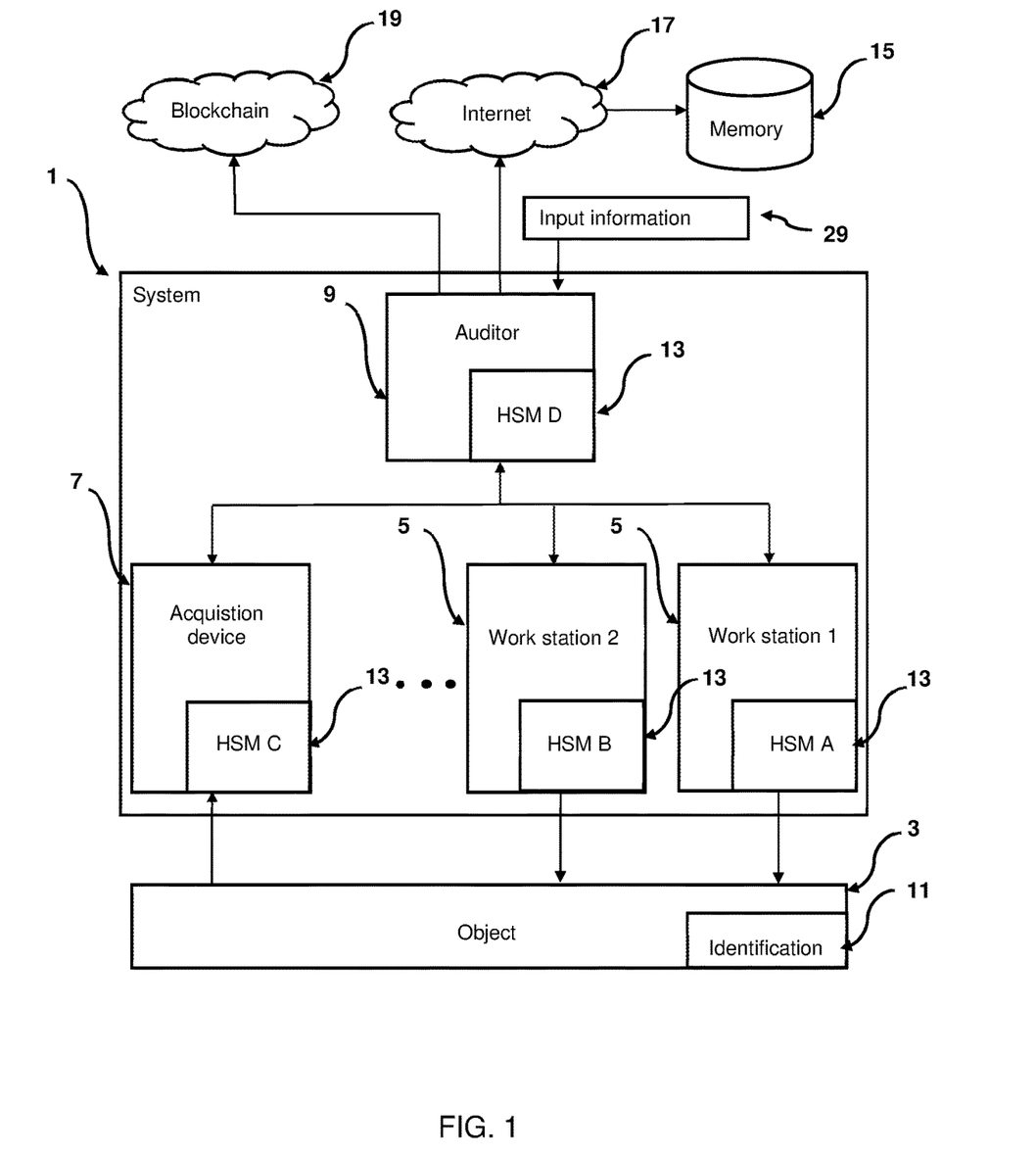
FIG. 1 illustrates a flow chart of a system embodiment of the present invention.
Figure 2:
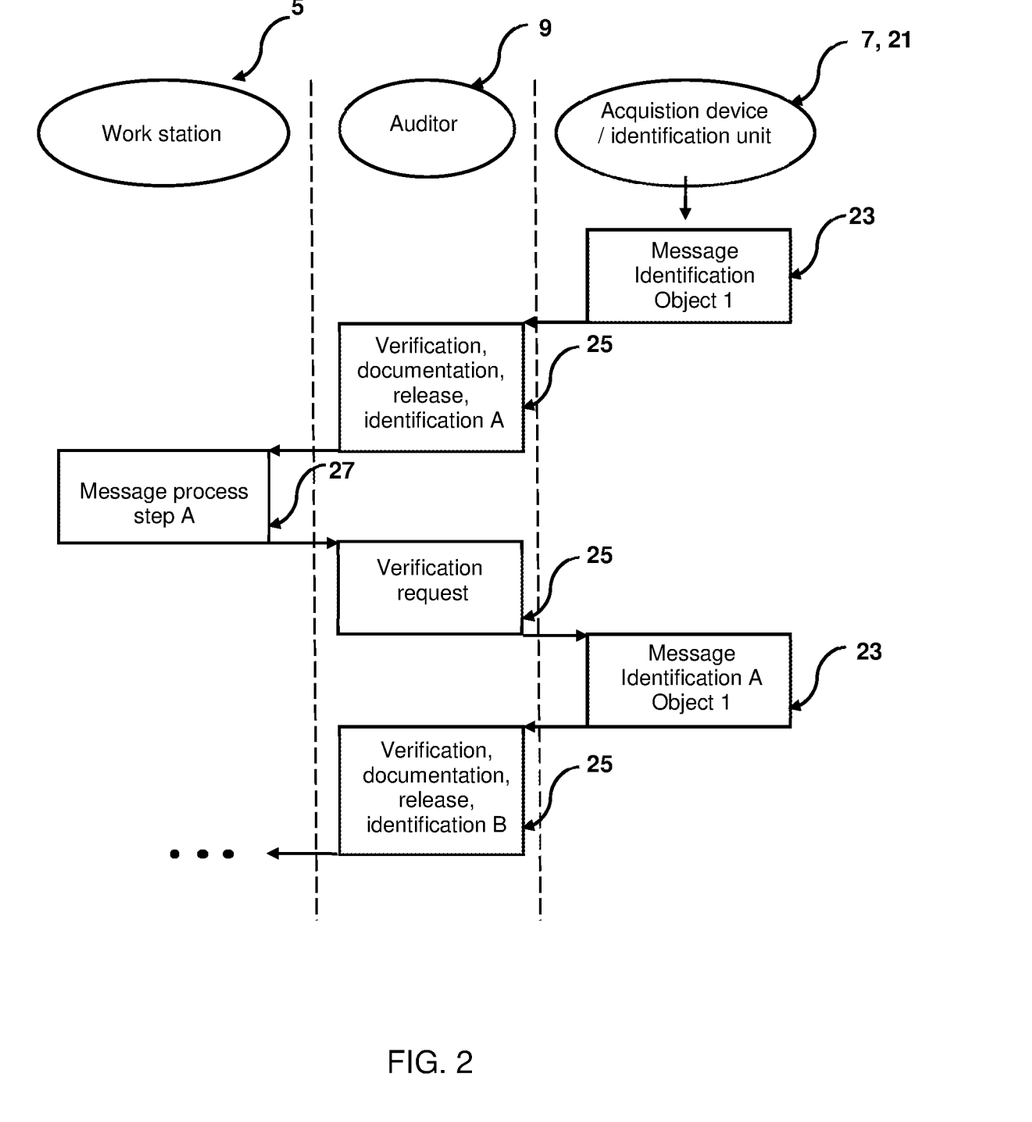
FIG. 2 illustrates a flow chart of a process embodiment of the present invention.

FIGS. 1 and 2: Flow Charts for illustrating the invention

FIG. 1 schematically depicts a system 1 in which several work stations 5 perform process steps on an object 3. The work station can be protected by a safety device in the form of an HSM 13, especially with regard to data transmission with other components. The acquisition device 7 may record at least one acquisition information assigned to the object 3, which relates especially to the process step. The acquisition device 7 may also be protected by an HSM 13. Object 3 preferably comprises an identification element 11, which can, for example, be acquired by an identification unit 21 and output to the auditor device. This can also be integrated in the acquisition device 7. It is also possible that the identification element 11 is only logically assigned to object 3 and is available in form of data in a memory 15 accessible to an auditor 9, for example in a network, preferably as part of the Internet 17.

The acquisition information is output to the auditor device 9, so that the assignment of the acquisition information to the identification element accomplished. It may be preferred that the auditor device 9 is provided with an input information 29, so that the assignment of the acquisition information to the identification element is executed depending on the input information 29. The auditor device 9 is preferably also secured by an HSM 13. Especially communication outside the system is preferably secured by cryptographic means, e.g., by using a public key infrastructure. The data of the auditor device consisting of mutually assigned acquisition information and identification elements 11 can also be secured with a block chain 19. Hereby, the process steps performed on an object 3 can preferably be stored and/or logged in a particular secure and transparent manner.

FIG. 2 depicts an example of a flow chart performed by system 1. An acquisition device 7 or an identification unit 21 can perform an output 23 of an identification element. In an embodiment, the system may include a measuring device, preferably in form of a work station 5, for vehicles and their exhaust gases on a busy road, the output of the identification element could be the identification 11 of a passenger car on the basis a recorded license plate by means of a camera. An auditor process step 25 of the auditor device 9 could now consist of carrying out a verification of said identification 11, for example by comparing additional information acquired by the camera, such as the vehicle type, with information on the vehicle type stored for the identification element 11.

Moreover, information, e.g., about the registration of the vehicle type at the measuring point could be stored for documentation purposes, preferably without an assignment with the identification element 11. If certain registration information, e.g., the measured exhaust gas values at the measuring point are within an accepted range, the auditor device 9 may issue a release assigned to the vehicle and its information element, e.g., for a route which is sent to the vehicle, e.g., in the form of binding navigation data. Said authorization or release is preferably forwarded to work station 5, where the necessary process steps are carried out.

These performed process steps can now be logged once more using the auditor device and may trigger another verification request 25 of the auditor device 9. For example, the verification request may consist of verifying that the process step actually causes the desired consequences, e.g., that the vehicle is actually driving on the approved route. This in turn can be carried out by an acquisition device 7 or an identification unit 21 by recording the relevant information, advantageously on the released route and by outputting 23 of the recorded identification element to the auditor device 9. Preferably, further recording information, e.g., concerning exhaust gas values of the vehicle, may be acquired. Subsequently an auditor process step 25 can be triggered once more and the process flow depicted may continue.

REFERENCE CHARACTER LIST 1 system
3 object
5 Work station
7 acquisition device
9 auditor device
11 identification element
13 HSM
15 memory
17 network/Internet
19 blockchain
21 identification unit
23 output identification element
25 auditor process steps
27 message process step
29 input information

What is claimed is:

1. A system for executing a work process on a postal product, wherein the work process comprises at least one process step and wherein at least one state of the postal product is changed at least temporarily by the work process, wherein the system comprises:
one or more work stations that execute the at least one process step of the work process; an acquisition device for detecting at least one acquisition information associated with the postal product, wherein the acquisition information comprises a status parameter of the postal product and an operating parameter of the work station, wherein the status parameter of the postal product describes a condition of the postal product, when the postal product passes through the work station, and wherein the operating parameter describes a state of the work station at a time, when the postal product passes through the work station;
an auditor device; and
a set of hardware security modules (HSM) that provide protection within the system and secure external communication to the system, where an individual HSM from the set of HSM is positioned in the one or more work stations, the acquisition device, and the auditor device;
wherein the HSM is a hardware-based cryptographic module formed by or included on a single chip module, an autonomous multi-chip module, or an embedded multi-chip module, the HSM adapted to store data in a secure manner and is configured to generate, store, use, and maintain security parameters comprising passwords, confidential data, or keys for encrypting data;
wherein the HSM further comprises at least one of a battery-powered circuit or a voltage monitor that integrates or provides for a real-time clock for time recording and time stamping;
wherein each work station is assigned an acquisition device, wherein the acquisition device is configured to acquire the operating parameter of the associated work station and the status parameter of the postal product, wherein an identification element is assigned to the postal product and the acquisition device is adapted to output the acquisition information to the auditor device, the auditor device being adapted to assign the acquisition information comprising the operating parameter of the work station describing the state of the work station at the time the postal product passes through the work station and the status parameter of the postal product describing the condition of the postal product, when the postal product passes through the work station, to the identification element of the postal product; and
wherein the auditor device is adapted to receive input information and to assign the acquisition information to the postal product depending on said input information.

2. The system according to claim 1 wherein the acquisition information comprises information on the passage of the postal product through the work station.

3. The system according to claim 1 wherein the identification element is physically assigned to the postal product.

4. The system according to claim 1 wherein the identification element is logically assigned to the postal product.

5. The system according to claim 1 wherein the auditor device is adapted to verify the acquisition information.

6. The system according to claim 1 wherein the auditor device is adapted to secure the acquisition information with crypto-graphic means.

7. The system according to claim 1 wherein the auditor device is adapted to store the acquisition information in at least one of a memory device of the postal product or in a cloud.

8. The system according to claim 1 wherein the auditor device is adapted to establish at least one of a link between the acquisition information and an ID of the postal product, an ID of the acquisition device, information on the work station, an ID of the auditor device or a time stamp.

9. The system according to claim 1 wherein the input information refers to information that the system receives from an external server.

10. The system according to claim 1 wherein the acquisition information can be changed on the basis of the input information.

11. The system according to claim 1 wherein the postal product is a piece of mail, an envelope, or a label strip.

12. The system according to claim 1 wherein the status parameter of the postal product comprises information on whether the postal product is wrinkled or dirty.

13. The system according to claim 1 wherein the HSM is Federal Information Processing Standard (FIPS) 140-2 certified.

14. The system according to claim 1 wherein the HSM further comprises a redundant memory.

15. The system according to claim 1 wherein the HSM further comprises a chain of certificates which are pre-loaded onto the HSM prior to operation.

16. The system according to claim 1 wherein the HSM is adapted to generate its own private and public device keys.

17. The system according to claim 16 wherein the private key does not leave the HSM at any time, while the public key can be handed over to an outside source including an external server for signing, and in return, the HSM receives a personalized, signed device certificate, with which the HSM provides security in an Internet of Things system (IOT).

18. The system according to claim 17 where authenticated TLS (Transport Layer Security) connections are established.

19. A method for executing a work process on a postal product, wherein the work process is executed by a work station and comprises at least one process step and wherein at least one state of the postal product is changed at least temporarily by said work process, the method comprising:
  a) providing the postal product;
  b) assigning an identification element to the postal product;
  c) acquiring at least one acquisition information by an acquisition device, wherein the acquisition information comprises a status parameter of the postal product and an operating parameter of the work station, wherein the status parameter of the postal product describes a condition of the postal product, when the postal product passes through the work station, and wherein the operating parameter describes a state of the work station at a time, when the postal product passes through the work station, wherein the acquisition device is configured to acquire the operating parameter of an associated work station and the status parameter of the postal product;
  d) transmitting the acquisition information by means of the acquisition device to an auditor device comprising a Hardware Security Module (HSM), wherein the auditor device receives input information; and
  e) assigning the acquisition information comprising the operating parameter of the work station describing the state of the work station at the time the postal product passes through the work station and the status parameter of the postal product describing the condition of the postal product, when the postal product passes through the work station, to the identification element of the postal product depending on said input information by means of the auditor device.

20. The method according to claim 19 wherein the postal product is a piece of mail, an envelope, or a label strip.

* * * * *